Oct. 29, 1963 G. KILNER 3,108,624
DEVICE FOR CUTTING AROUND PITS IN DRUPES; CORING
AND SEGMENTING FRUIT BODIES
Filed March 14, 1960 3 Sheets-Sheet 1
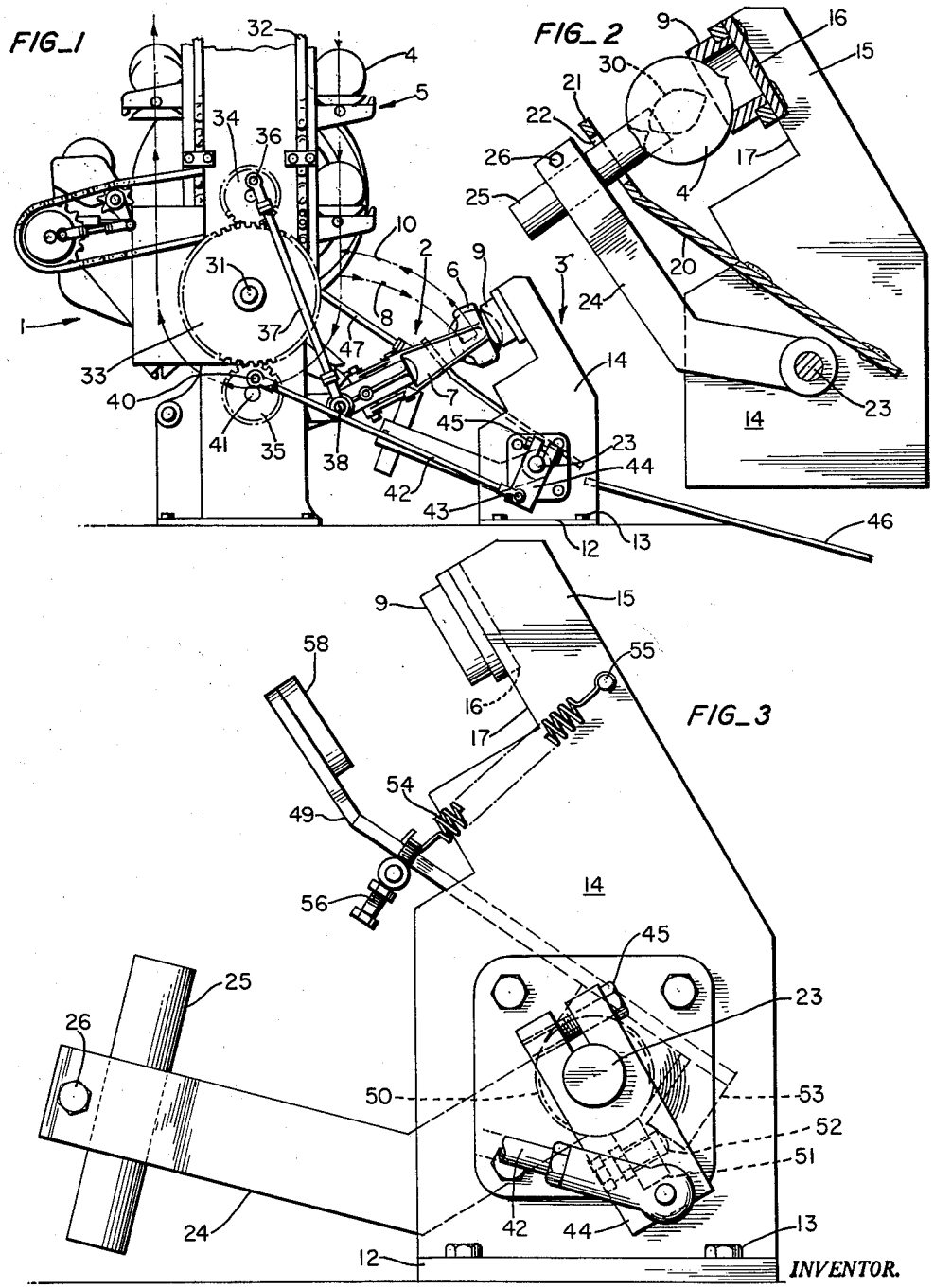
INVENTOR.
GEORGE KILNER
BY
Boyken, Mohler & Wood
ATTORNEYS

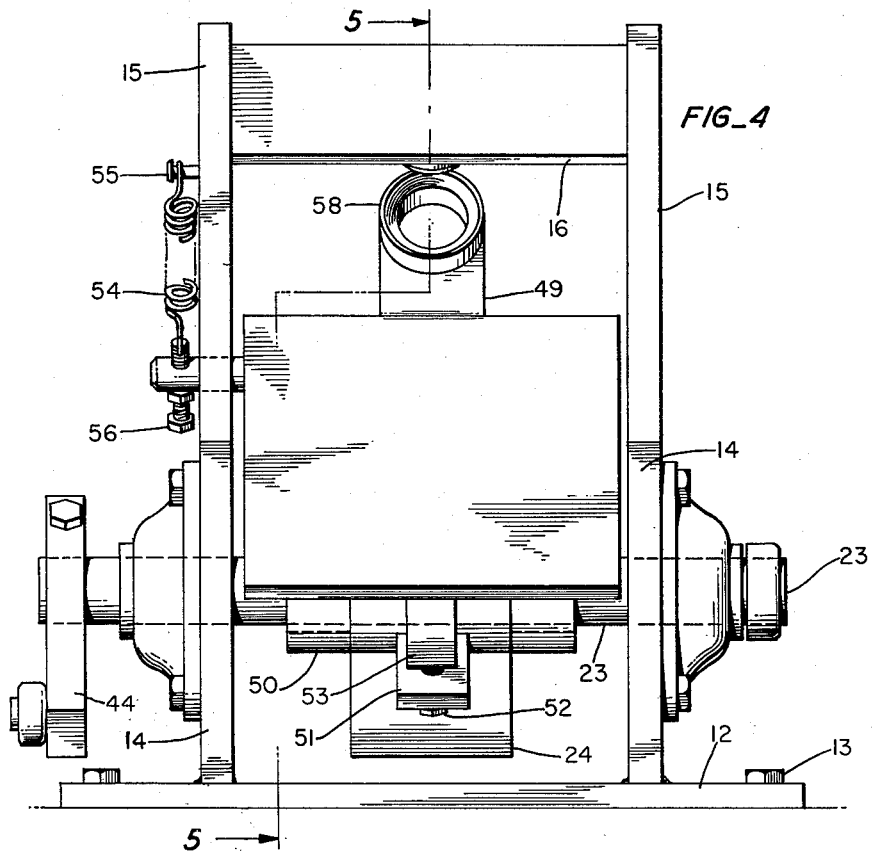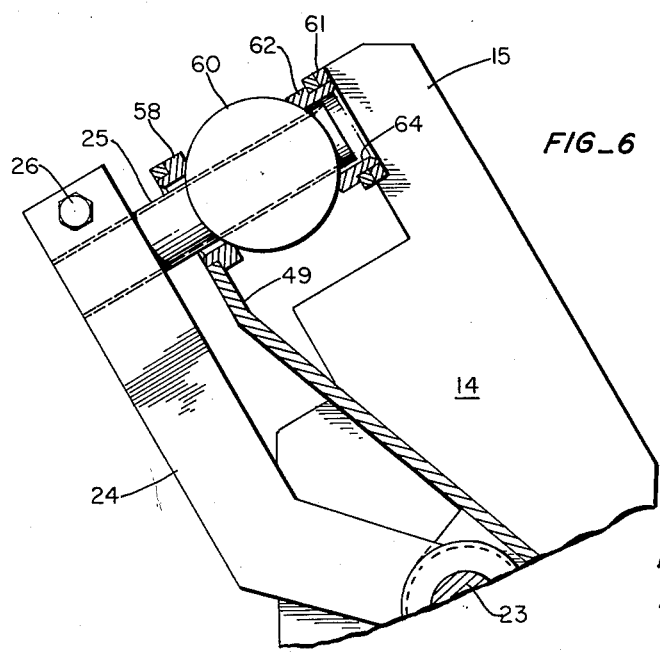

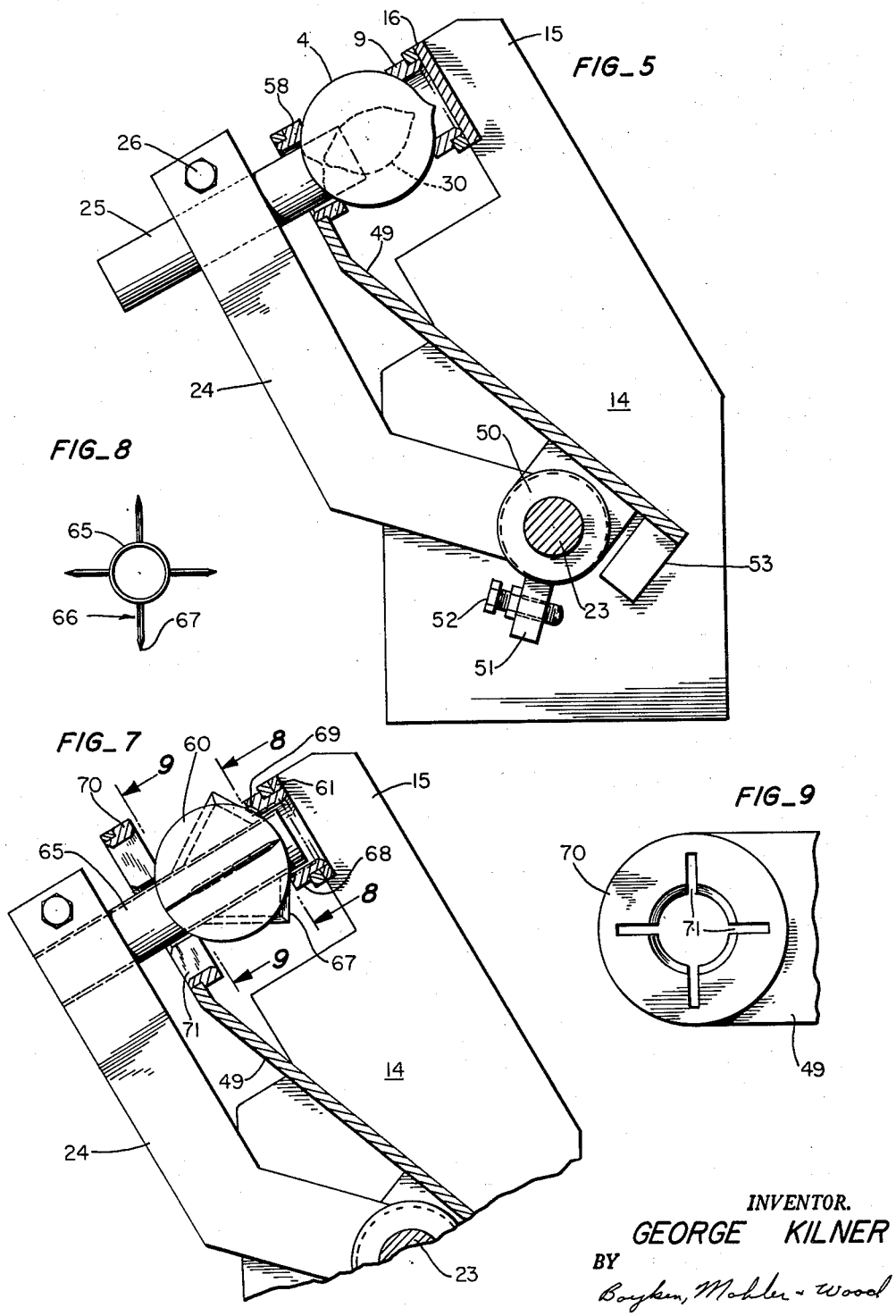

3,108,624
DEVICE FOR CUTTING AROUND PITS IN DRUPES; CORING AND SEGMENTING FRUIT BODIES
George Kilner, Oakland, Calif., assignor to Filper Corporation, San Leandro, Calif., a corporation
Filed Mar. 14, 1960, Ser. No. 14,678
9 Claims. (Cl. 146—52)

This invention relates primarily to a device for cutting into whole generally spherical fruit bodies, such as drupes, apples and the like. In the case of drupes, the invention provides for cutting into each drupe from one end (preferably the stem end) and around the pit for a predetermined distance between the stem and blossom ends in order to prepare the drupe for further processing such as cooking, pickling and the like.

In the case of apples, for instance, the same device, but with an adjustment for a longer cutting stroke, may be used to cut completely through the fruit body around the core for coring the apple, and by the addition of radially extending blades the same device may simultaneously core and halve, or segment a fruit body.

One of the objects of the invention is the provision of a simple device adapted to efficiently accomplish the above described desired results.

Another object of the invention is the provision of a combination that includes a transfer device for transferring whole fruit bodies having stem-blossom ends to a fruit cutting device that is adapted to penetrate such bodies in a position for entry of a cutter on such device along the blossom stem axis of such body.

A still further object of the invention is the provision of a device that is adapted to form a cut around the pit in a drupe preparatory to further processing of the fruit, such as cooking, pickling, etc., and which device is far more compact, simple, rugged and reliable than devices heretofore provided for accomplishing the same result.

Another object is the provision of a device for cutting around the pit in a drupe from its stem end for a predetermined distance toward said blossom end, and which device is readily adapted for receiving fruit from the transfer mechanism of a fruit conveyor or fruit-orienting apparatus.

In the pickling of clingstone peaches, or other clingstone drupes, it is desirable to cut around the pit before the pickling operation while the fruit is firm. When this is done, the eating of the pickled drupe is facilitated, since the flesh is separated from the pit by the cut that was made. In the absence of the preformed cut, the pickled fruit will roll around on a plate during an attempt to cut it from the drupe, and frequently it will be accidentally ejected off the plate.

Previous attempts to form a cut around the drupe have been quite complicated and expensive to make and to maintain in proper working condition, and have taken up considerable room. The present invention overcomes the above objections and, in its simplest form, includes only a single moving part, with outer parts thereof substantially fully exposed and readily accessible for cleaning.

Other objects and advantages will appear in the description and drawings.

In the drawings, FIG. 1 is a side elevational view of one form of the cutting device in combination with a fruit orienting mechanism and transfer device.

FIG. 2 is an enlarged vertical sectional view taken through the cutting device of FIG. 1, but with the cutter and the arm mounting the same being shown in elevation.

FIG. 3 is an enlarged side elevational view of a device similar to that of FIG. 2 but slightly modified.

FIG. 4 is an elevational view of the device of FIG. 3, as seen at right angles to the latter, or from the rear side thereof.

FIG. 5 is a sectional view taken along line 5—5 of FIG. 4.

FIG. 6 is a fragmentary view, partly in section, showing the device of FIG. 3 modified or adjusted for coring a fruit body.

FIG. 7 is a fragmentary view partly in section, showing the device of FIG. 6 with several blades added for sectioning or segmenting a fruit body at the same time it is cored.

FIG. 8 is an end elevational view of the coring and segmenting blades taken along line 8—8 of FIG. 7.

FIG. 9 is a fragmentary view of the stripper plate only as seen from line 9—9 of FIG. 7.

In detail, FIG. 1 shows the lower portion of a fruit-orienting apparatus, generally designated 1, and a fruit transfer device 2 for transferring oriented fruit to the fruit cutting device, generally designated 3, that will hereafter be described more in detail.

The said fruit-orienting device corresponds in its elements and manner of operation with the fruit-positioning apparatus disclosed in United States Letters Patent No. 2,786,562, issued March 26, 1957, to E. R. McClelland, in which drupes, apples or the like indicated at 4 are carried downwardly in supports 5 of an endless, vertically extending conveyor, and which bodies are oriented during said downward movement to position their stem ends downward.

Adjacent to the lower end of the conveyor, a pair of opposed clamps 6 on the outer ends of arms 7 swing toward each other to clamp one of the drupes or fruit bodies 4 therebetween, and the arms then swing laterally about a pivotal mounting at their inner ends to carry the fruit body 4 gripped between the clamps 6 along a path of travel 8 to a position adjacent to a seat 9 on the cutting device 3. The arms are then swung apart to release the fruit body delivered to seat 9 and return along path 10 for gripping the next fruit on the endless conveyor of the orienting apparatus.

Referring to the cutting device of FIG. 2, it should be mentioned that, except for modifications in the cutter and in the fruit stripping element, the devices of FIGS. 3 to 8 are substantially the same. The same frame and fruit seat, and cutter are used as appear in FIG. 5. The form shown in FIGS. 1 and 2 is the preferred form since it includes only one moving part.

The frame of the cutting device 3 comprises a base 12 (FIGS. 1, 4) adapted to be rigidly bolted by bolts 13 to any suitable support. A pair of similar horizontally spaced approved side frame members 14 rigid with said base extend upwardly therefrom, and these plates have upward extensions 15 integral therewith at their upper ends that are inclined to one side (FIGS. 1, 2).

A cross frame member 16 extends between the extensions 15 and is rigidly secured thereto at the edges of the latter that are on the generally downwardly facing edges of said side frame members, and which edges are also generally directed toward the fruit transfer device.

Cross frame member 16 may be flat and inclined transversely thereof the same as edges 17 against which the member 16 is secured.

Centrally between the ends of the cross frame member 16 is an annular seat 9 that projects from the side of the cross frame member 16 that faces generally toward the fruit transfer device 3, and which seat is inclined the same as member 16.

The circular outer edges of the seat 9 may be beveled on their inner sides so as to generally fit against the approximately spherical contour of the side of a drupe 4 at its blossom end (FIG. 2).

Spaced from seat 9, at the same side of the frame as that to which the seat projects, is a stripper plate 20 that is rigidly secured to the frame and which plate has an outer end portion 21 in opposed, parallel relation to seat 9. A portion of the plate 20 below portion 21 extends slantingly downwardly from portion 21 between the sides 14 of the frame.

The distance between the portion 21 and the seat 9 is greater than the maximum diameter of the fruit body 4 that is to be positioned against the seat and between the stripper and the seat.

Portion 21 of the stripper is apertured at 22 for passage therethrough of the cutter.

A horizontal shaft 23 is rotatably supported at its ends in bearings carried by frame members 14 below the stripper plate 20. An angularly shaped arm 24 is secured at one of the ends to the central portion of shaft 23 and projects generally laterally therefrom below the stripper plate. A cylindrical cutter 25 is adjustably carried on the outer end of the arm. Said outer end of arm 24 is formed with an opening 27 and is split at one side of the opening to provide a clamping of the cutter 25 on the outer end of the arm at different degrees of projection of the cutting end of the cutter toward seat 9. A screw 26 provides for loosening and tightening the cutter.

Whether the upper end portion 21 of the stripper 20 is apertured or is forked for passage of the cutter therepast is immaterial, but in any event, the opening provided for such passage is adequate to enable the cutter 25 to freely move therethrough and to a position into the fruit body 4 in encircling relation to the pit 30 within the drupe or body 4 when the blossom end of such body is seated against seat 9. The degree of penetration of the cutter will depend upon the degree of projection of the cutter from arm 24 toward the seat 9. Also, the arm 24 itself is usually adjusted when each adjustment of the cutter is made, as will later be described more in detail.

Referring to FIG. 1 a continuously driven rotating shaft 31 on the fruit orienting apparatus mounts the sprocket wheels around which extend the lower ends of the endless chains 32 that carry the cups or orienting supports 5. This shaft 31 carries a gear 33 on one end thereof, the teeth of which are in mesh with the teeth of an upper pinion 34 and a lower pinion 35. Upper pinion 34 has a pin 36 pivotally supporting the upper end of a connecting rod 37 that extends downwardly from pin 36 for a pivotal connection at 38 with the transfer device for swinging arms 7 and fruit clamps 6 laterally, all as shown and described in detail in said United States Letters Patent 2,786,562.

The lower pinion 35 is added to the fruit orienting apparatus, and is rotated by gear 33. A pin 40, secured on pinion 35 eccentric to the stub shaft 41, pivotally supports one end of a connecting rod 42, the opposite end of which is pivotally connected by pivot 43 with the outer end of an arm 44. The inner end of arm 44 is adjustably clamped to one end of the shaft 23 that projects outwardly of one of the side frame members 14. A screw 45 connecting the split end of the arms 44 through which the end of shaft 23 extends enables adjusting the angular relationship of arm 24 that carries the cutter 25 upon an adjustment being made in the degree that the cutter projects toward seat 9.

At the side of the fruit cutting device that is opposite to the cutter, a ramp or chute 46 extends downwardly (FIG. 1) from a position of its uppermost end between frame sides 14 and below the lower end of the stripper plate 20.

In operation, referring to the form of the invention as shown in FIGS. 1 and 2, the fruit body, which is illustrated as a drupe, such, for example as a clingstone peach, is oriented by the orienting apparatus to a position in which its stem end is directed downwardly.

Upon each drupe 4 reaching a position adjacent to the lower end of the endless conveyor that includes the orienting supports or cups 5, the horizontally movable clamps on the outer ends of arms 7 move to opposite sides of the drupe and into gripping engagement with said sides through the action of a link 47 as shown and described in said Patent 2,786,562. The fruit body so gripped is then swung under the influence of rod 37 to a position directly opposite to seat 9 with its blossom end facing the seat, and with its stem-blossom axis substantially coaxial with said seat.

The swinging of arms 7 of the transfer device is synchronized with the movement of the rod or link 42 so that the arm 24 carrying the cutter 25 will be swung to bring the cutting edge of the cutter into impaling relation with the drupe substantially simultaneously with a release of the drupe by the clamps 6, so that the drupe is held against the seat 9 by the cutter when the clamps 6 move away from the drupe at the commencement of their return movement to pick up another drupe.

The cutter will penetrate the drupe to whatever degree is desired, and the pit 30 will extend into the cutter upon such penetration. This penetration of the blade may extend the major length of the pit, in which case the pit will be loosened, but not freed, or it may extend only a fraction of the distance into the fruit, as seen in FIG. 2, in which case access of the pickling solution to around the pit is facilitated, but the pit is not loosened by the cutter. In any event the cutter does not grip the pit, its diameter being sufficient to enable the desired degree of penetration without the pit being gripped by the cutter.

Upon retraction of the cutter away from the seat 9, the drupe will be carried with it until the drupe engages the stripper 20, whereupon the drupe will be stripped from the cutter as the cutter is further retracted to withdraw the cutter from the stripper. The freed drupe will then drop onto the inclined part of the stripper plate below its upper end portion, and the drupe will roll between the side frame members 14, which function as guide means, onto a conveyor or chute 46 for carrying away for further processing of the drupe.

By the above arrangement, it is seen that the cutter holds the drupe against the seat 9 hence no means other than the cutter and seat 9 are required upon release of the clamps 6 of the transfer device, and the cutter moves into engagement with the stem end of the drupe when the drupe is positioned between the cutter and the seat 9 after which the cutter moves the drupe against the seat. In the disclosure in said Patent No. 2,786,562 the transfer device impaled the fruit on a blade, which is the reverse of the present action, although in said patent, the blade was merely a flat sided support for supporting the drupe preparatory to further movement the drupe to a pitting point and in which pitting operation the blade performed no function.

In FIGS. 3 to 5 the fruit cutting device is modified slightly so that the fruit may be held by the stripper plate against the seat for the drupe, instead of the cutter performing this function.

The frame, including base 12, side frame member 14, seat 9 and bar 16 are the same as in FIGS. 1 and 2 and bear the same numbers. Arm 24 carrying the cutter 25 are also the same as in FIGS. 1, 2.

The stripper plate 49 differs in certain respects in that it is rotatably mounted at its lower end on shaft 23 by suitable bearings 50 (FIG. 4) depending from the underside thereof at opposite sides of the lower end of arm 24.

A lug 51 is provided on the lower end of arm 24 projecting radially outwardly relative to shaft 23, and a screw 52 threadedly extends through said lug at right angles thereto so that the end of the screw opposite to its head will project from a side of said lug.

The lower end of the stripper plate 49 projects downwardly past the shaft 23 and carries a member 53 thereon projecting toward the projecting end of screw 52 for engagement by said screw upon the arm 24 being swung counterclockwise, as seen in FIG. 3, upon movement of the arm 24 and the cutter to the end of its retractive stroke in direction away from seat 9.

A helical spring 54 is secured at one end to a pin 55 that is secured to one side frame member 14, and the other end of said spring is secured to a tension adjusting screw 56. This screw 56 is pivotally secured to the stripper plate 49.

The upper end of the stripper plate may carry an annular seat 58 that is adapted to engage the side of the drupe or fruit body 4 around the stem end, said seat projecting toward seat 9 and being approximately coaxial therewith. The cutter 25 is adapted to move through the central opening in seat 58.

In actual practice, when arm 24 is moved to its retracted position under the action of the connecting rod 42, the screw 52 will engage the member 53 to cause the upper end of the stripper plate including the seat 58 thereon, to move away from the seat 9. Upon a drupe 4 being positioned adjacent to seat 9, in the same manner and position as described for FIG. 1, the arm 24 will move toward the seat 9 whereupon the stripper plate will be yieldably moved against the drupe to yieldably hold it between seats 58, 9, and the continued movement of arm 24 will carry the cutter to the position shown in FIG. 5 in which it penetrates into the drupe around the pit.

Upon movement of the cutter 25 away from the seat 9 the stripper plate will still hold the drupe against the seat 9 until the cutter is retracted from the stripper plate, at which time the screw 52 will engage member 53 to forceably move the stripper plate away from the drupe to release the drupe.

The device of FIGS. 3 to 5 could, of course, be manually fed or fed by other types of feeders that are not adapted to operate in the same manner as the transfer device shown in FIG. 1.

FIG. 6 shows the same structure as FIGS. 3 to 5 except that the cutter 25 is adjusted for performing a coring operation on an apple 60 or other seed fruit, and the bar 61 and seat 62 that correspond in position and function to the bar 16 and seat 9 are different.

In FIG. 6 the bar 61 is formed with an internally threaded opening centrally between its ends. The seat 62 for the fruit 60 is a shank that is secured in said opening and the seat and shank are centrally open as at 64.

The cutter 25 in FIG. 6 is adjusted so that the cutting end will extend into the opening 64 at the end of the stroke of arm 24 upon its movement toward seat 62. This adjustment of the cutter is such that a complete coring of apples or other fruit will be completed, even though there are variations in size. Each core will be pushed through the cutter for ultimate discharge from its open end opposite to the cutting end by a subsequent coring operation.

FIGS. 7, 8, 9 show structure wherein the fruit 60 may be simultaneously cored and halved or cut into segments.

The only differences between the structures of FIG. 7 and FIG. 5 are in the cutter, the stripper seat and the fixed seat.

The cutter 65 is cylindrical, the same as cutter 25. Radially extending cutting blades 66 (FIG. 8) in whatever number are desired, are secured to the cutter 65 and project outwardly therefrom. The cutting edges 67 face generally toward the fixed seat 68 that is secured to bar 61 in the same manner as seat 62 is secured to said bar 61.

The seat 68 may be cut away at 69 opposite to the cutting edges of the blades so such edges will enter the cut away portions to insure clean halving or segmenting of the fruit, without possibility of injuring said cutting edges through contact thereof with the seat.

The seat 70 in the stripper is shown best in FIG. 9 in which it is seen that radially extending recesses 71 formed in the sides of the central opening for the cutter 65 will pass the blades 66.

The operation of the device of FIGS. 1 and 2 is believed to be clear. The devices of FIGS. 3 to 7 may be used in combination with the same feeder or transfer device as shown in FIG. 1 and also in combination with other type of feeders since the space in which the fruit is positioned for cutting is greater and the stripper is relied upon for holding the fruit. Also in the device of FIGS. 3 to 7 it may be fed manually. No invention would be required to provide a suitable shield for the cutter, if required.

It is to be understood that the claims appended hereto are intended to cover all changes and modifications of the examples of the invention herein chosen for the purposes of the disclosure, which do not constitute departures from the spirit and scope of the invention.

I claim:

1. A device for cutting around the pit in a drupe comprising: a stationary frame, a seat rigid with said frame against which the blossom end of a drupe is adapted to be seated with its stem-blossom axis substantially centered relative to said seat, a generally cylindrical cutter having a substantially circular cutting edge at one end thereof, means supporting said cutter on said frame for oscillatory movement toward and away from said seat and into a drupe having its blossom end against said seat upon movement of said cutter toward said seat, and to a retracted position out of such drupe upon movement away from said seat, and means comprising a shaft rotatably supported on said frame and an arm secured on and projecting generally radially from said shaft having said cutter on its outer end, means connected with said shaft for effecting oscillatory movement thereof for oscillating said cutter, and stripping means carried by said frame spaced from said seat and between said seat and said cutter when the latter is in said retracted position for engagement by said drupe for stripping such drupe from said cutter upon movement of said cutter away from said seat to said retracted position, means supporting said stripping means for oscillatory movement toward and away from said seat and into engagement with a drupe positioned against said seat upon movement of said stripping means toward said seat for holding said drupe against said seat during cutting by said cutter, yieldable means connecting with said stripping means for so moving said stripping means toward said seat, and means respectively connected with said arm and with said stripping means for moving said stripping means away from said seat upon movement of said arm and cutter in a direction away from said seat.

2. A device for cutting a fruit body comprising: a rigid frame having an upstanding projection thereon, a generally laterally directed seat carried by said projection against which such body is adapted to be positioned for cutting thereof, a cutter swingable toward and away from said seat for movement into and out of such body when the latter is against said seat, a shaft rotatable on said frame having an arm projecting generally radially thereof to the side of said projection toward which said seat is directed, said cutter being carried on said arm for swinging thereof toward said seat and into such body upon rotation of said shaft in one direction and away from said seat and such body upon rotation of said shaft in an opposite direction, a relatively wide plate extending under said seat and spaced therebelow, said plate being inclined relative to vertical to deflect fruit bodies released from said cutter and seat laterally away from said device, the upper portion of said plate being disposed between said cutter and said seat when said cutter is at the end of its stroke away from said seat, said upper portion being apertured for passage of said cutter to and into a fruit body against said seat upon movement of said cutter toward said seat and into such body, said upper portion being adapted to engage such body after cutting thereof by said cutter and to restrain said body against movement with said cutter in a direction away from said seat upon movement of said cutter away from said seat for releasing said fruit body from said cutter for falling of said body onto said plate.

3. In combination, a fruit aligning machine including means for successively positioning whole fruit bodies having stem-blossom axes at a predetermined transfer point with said axes vertical at said point; a fruit transfer device including horizontally spaced fruit clamping means supported for movement into gripping relation with opposite lateral sides of a fruit body at said point, means connected with said clamping means supporting them for generally laterally and downwardly oscillatory movement away from said point for carrying a fruit body gripped between said clamping means to a discharge point, fruit cutting means adjacent to said discharge point including a rigid frame having a generally laterally directed substantially annular seat and a cutter having a substantially annular cutting edge spaced laterally from said seat, means supporting said fruit cutting device in a fruit receiving position in which position said seat is coaxial with the stem-blossom axis of a fruit body at said discharge point and closely adjacent to said discharge point with said seat and said cutter at opposite sides of said point, means supporting said cutter for movement toward said seat and into a body at said discharge point in a position substantially coaxial with said seat and with the stem blossom axis of said body for forming an annular cut in said body that is substantially coaxial with said stem-blossom axis.

4. In combination with a fruit orienting machine for positioning generally spherical fruit bodies with their stem-blossom axes in a predetermined position at a transfer point; a device spaced from said transfer point having an annular stationary seat against which a side of each of such fruit bodies is adapted to be positioned with its stem-blossom axis substantially coaxial with the axis of said seat, transfer means movable between said transfer point and said seat having fruit engaging means engageable with each fruit body at said transfer point for carrying each body from said transfer point to a seating position adjacent to said seat with the stem-blossom axis of each body substantially coaxial with the axis of said seat, actuating means connected with said transfer means for so moving the latter between said transfer point and said seat and for moving said transfer means into carrying engagement with each drupe at said transfer point, a cutter having a substantially annular cutting edge, means supporting said cutter for movement from a starting position spaced from said seat and from a fruit body in said seating position toward such body to a cutting position in which said body is held between said seat and said cutting edge with the latter substantially coaxial with the stem-blossom axis of the body so held, said actuating means including releasing and retracting means actuatable for releasing said transfer means from each body when the latter is held between said cutting edge and said seat and for returning said transfer means to said transfer point, means connected with said cutter for so moving said cutter to said cutting position and into the body engaged thereby axially of said stem-blossom axis.

5. In combination with a fruit orienting machine for positioning generally spherical fruit bodies with their stem-blossom axes in a predetermined position at a transfer point; a device spaced from said transfer point having an annular stationary seat against which a side of each of such fruit bodies is adapted to be positioned with its stem-blossom axis substantially coaxial with the axis of said seat, transfer means movable between said transfer point and said seat having fruit engaging means engageable with each fruit body at said transfer point for carrying each body from said transfer point to a seating position adjacent to said seat with the stem-blossom axis of each body substantially coaxial with the axis of said seat, actuating means connected with said transfer means for so moving the latter between said transfer point and said seat and for moving said transfer means into carrying engagement with each drupe at said transfer point, a cutter having a substantially annular cutting edge, means supporting said cutter for movement from a starting position spaced from said seat and from a fruit body in said seating position toward such body to a cutting position in which said body is held between said seat and said cutting edge with the latter substantially coaxial with the stem blossom axis of the body so held, said actuating means including releasing and retracting means actuatable for releasing said transfer means from each body when the latter is held between said cutting edge and said seat and for returning said transfer means to said transfer point, means connected with said cutter for so moving said cutter to said cutting position and into the body engaged thereby axially of said stem-blossom axis, means supporting said seat stationary with its axis extending generally horizontally whereby a fruit body released from said cutter, and said transfer means will fall by gravity from said seating position, said means connected with said cutter for moving it into holding and cutting relation with said body being actuable for movement to body releasing position spaced from said body after each cutting operation, and stripping means adjacent to said cutter engageable with each body upon movement of said cutter to said body releasing position for freeing each body from said cutter to permit each body to so fall.

6. A device for cutting a whole fruit body around its stem-blossom axis comprising: a stationary, generally laterally facing seat equally spaced around a generally laterally extending axis against which one side of such body is adapted to be seated with its said stem-blossom axis coaxial with the said axis of said seat, a cutter having a substantially annular cutting edge; means supporting said cutter for oscillatory movement between a body engaging position coaxial with said axis of said seat and in which said cutting edge is in engagement with the opposite side of such body relative to said one side thereof for thereby holding said body between said seat and said cutter against falling of said body by gravity, and a body releasing position in which said body is free for falling; means connected with said cutter for so causing said oscillatory movement and for moving said cutter a predetermined distance into said body substantially along said axis after said engagement therewith; transfer means adjacent to said seat supported for movement from a fruit engaging position spaced from said seat to a delivery point in which each body is adjacent to said seat and between said cutter and said seat for said engagement by said cutter, means connected with said transfer means and with said cutter for causing said transfer means to deliver a fruit body to a position adjacent to said seat at substantially the moment said cutter is in a position to engage said body and to release such body upon engagement of said cutter with said body, whereby said body will be held by said cutter and seat against falling by gravity until said cutter is withdrawn from said body and seat.

7. A device for cutting into the generally spherical body of a fruit having a stem-blossom axis around said axis comprising: a rigid frame having a base and a seat carrying member thereabove, an annular generally laterally facing seat supported on said member spaced above said base, a cutter having an annular cutting edge adapted to cut into such fruit body around the said stem blossom axis of the latter, an arm supported at one end thereof on said frame for oscillatory movement of the opposite end thereof, and a shaft on said frame so supporting said one end of said arm for said oscillatory movement of said opposite end toward and away from said seat, means securing said cutter to said opposite end in a position for entering a fruit body around its said axis when such fruit is against said seat and when said arm is actuated for carrying said cutter toward a fruit body that is against said seat, fruit transfer means operatively connected with said shaft for successively carrying fruit bodies to a position adjacent to said seat and between the latter and said cutter for being cut by the latter; said fruit transfer means including fruit engaging means supported for movement into and out of carrying engagement with said fruit bodies, means connected with said fruit engaging means for moving the latter into said carrying engagement for the period of movement of said transfer means toward said seat and for moving the latter out of said engagement upon movement of said cutter into engagement with a fruit body that is against said seat.

8. A device for cutting around the stem end of a pit within a clingstone peach comprising, in combination, a generally laterally facing annular seat against which the blossom end of said peach is adapted to be positioned with its stem-blossom axis substantially coaxial with said seat, a cylindrical cutter having a substantially circular cutting edge at one end thereof, the diameter of said cylinder and said cutting edge being sufficiently great to encircle said pit at the stem end thereof when said edge is substantially coaxial with said blossom-stem axis, a stationary frame supporting said seat stationary; a pair of peach holding means movable into holding engagement with two opposite sides of a clingstone peach for releasably holding such peach therebetween with its blossom and stem ends exposed for engagement respectively with said annular seat and with said cutting edge, means connected with said peach holding means for moving them into said holding engagement with said two opposite sides of said peach at a location remote from said seat, peach positioning means at said location for positioning said peach between said pair of peach holding means with its blossom-stem axis in a predetermined position in which its blossom and stem ends are exposed for said engagement with said seat and cutting edge; supporting means connected with said peach holding means supporting the latter for movement from said location while in peach holding relation to a position at said seat with the blossom end of a peach held between said peach holding means adjacent to said seat and with the blossom-stem axis of such peach substantially coaxial with said seat, means connected with said supporting means for so moving the latter; means on said frame supporting said cutter for axial movement thereof from a retracted position spaced from said seat to pit encircling position of said cutting edge with the axis of said cutter substantially coaxial with said axis of said seat and with the blossom-stem axis of a peach held at said seat by said peach holding means, and means connected with said cutter for so moving the latter.

9. In a construction as defined in claim 8, said cutter being below said axis of said seat when in said retracted position, said peach positioning means being positioned above said axis of said seat, and said supporting means supporting said peach holding means for movement generally laterally and downwardly from said peach positioning means to said seat.

References Cited in the file of this patent
UNITED STATES PATENTS

| | | |
|---|---|---|
| 98,457 | Wright | Dec. 28, 1869 |
| 743,860 | Goodspeed | Nov. 10, 1903 |
| 1,066,233 | Steelman et al. | July 1, 1913 |
| 2,567,591 | Ashlock | Sept. 11, 1951 |
| 2,786,562 | McClelland | Mar. 26, 1957 |